United States Patent
Bhatt et al.

(10) Patent No.: US 10,303,729 B2
(45) Date of Patent: May 28, 2019

(54) TECHNIQUES FOR FILTERING CONTENT PRESENTED IN A WEB BROWSER USING CONTENT ANALYTICS

(71) Applicant: International Business Machines Corporation, Armonk, NY (US)

(72) Inventors: Dhruv A. Bhatt, Indian Trail, NC (US); Kristin E. McNeil, Charlotte, NC (US); Nitaben A. Patel, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 15/183,425

(22) Filed: Jun. 15, 2016

(65) Prior Publication Data

US 2016/0292287 A1 Oct. 6, 2016

Related U.S. Application Data

(63) Continuation of application No. 14/659,208, filed on Mar. 16, 2015.

(51) Int. Cl.
*H04L 12/58* (2006.01)
*G06F 17/27* (2006.01)
*G06F 16/9535* (2019.01)
*G06F 16/2452* (2019.01)
*G06F 17/28* (2006.01)
*H04L 29/08* (2006.01)

(52) U.S. Cl.
CPC .... *G06F 16/9535* (2019.01); *G06F 16/24522* (2019.01); *G06F 17/272* (2013.01); *G06F 17/2735* (2013.01); *G06F 17/2765* (2013.01); *G06F 17/28* (2013.01); *H04L 51/14* (2013.01); *H04L 51/32* (2013.01); *H04L 67/306* (2013.01)

(58) Field of Classification Search
None
See application file for complete search history.

(56) References Cited

U.S. PATENT DOCUMENTS

| 8,856,124 B2 | 10/2014 | Jing et al. |
| 9,426,239 B2 * | 8/2016 | McCandless ........... H04L 67/22 |
| 2008/0244438 A1 * | 10/2008 | Peters ............... G06F 17/30867 715/772 |
| 2009/0055242 A1 | 2/2009 | Rewari et al. |

(Continued)

FOREIGN PATENT DOCUMENTS

| WO | 2009140085 A2 | 11/2009 |
| WO | 2012075729 A1 | 6/2012 |

OTHER PUBLICATIONS

International Business Machines Corporation, "List of IBM Patents or Patent Applications Treated as Related," Jun. 15, 2016, 2 pages.

*Primary Examiner* — Natisha D Cox
(74) *Attorney, Agent, or Firm* — Patterson + Sheridan, LLP

(57) ABSTRACT

Techniques presented herein describe filtering content rendered on a web browser. An analytics engine receives an aggregated feed to send to a requesting user. The aggregated feed includes one or more posts. For each of the posts, the analytics engine evaluates content of the post to determine whether a subject specified in a profile associated with the requesting user is present in the content. Upon determining that the subject is present in the content, the analytics removes the content from the post.

10 Claims, 8 Drawing Sheets

(56) References Cited

U.S. PATENT DOCUMENTS

| | | | |
|---|---|---|---|
| 2009/0094187 A1* | 4/2009 | Miyaki | G06F 21/6218 |
| 2010/0223226 A1* | 9/2010 | Alba | G06Q 30/02 |
| | | | 706/55 |
| 2012/0239763 A1* | 9/2012 | Musil | G06Q 50/01 |
| | | | 709/206 |
| 2012/0278329 A1* | 11/2012 | Borggaard | G06F 17/30699 |
| | | | 707/738 |
| 2013/0024511 A1* | 1/2013 | Dunn | G06Q 10/10 |
| | | | 709/204 |
| 2013/0024788 A1* | 1/2013 | Olsen | G06Q 10/10 |
| | | | 715/753 |
| 2013/0046826 A1* | 2/2013 | Stanton | G06Q 10/10 |
| | | | 709/204 |
| 2013/0054699 A1* | 2/2013 | MacAskill | G06Q 10/101 |
| | | | 709/204 |
| 2013/0282835 A1 | 10/2013 | Bates et al. | |
| 2013/0298038 A1* | 11/2013 | Spivack | H04L 65/403 |
| | | | 715/753 |
| 2014/0101611 A1* | 4/2014 | Lang | G06F 21/32 |
| | | | 715/813 |
| 2016/0036756 A1* | 2/2016 | Jorgenson | H04L 51/32 |
| | | | 709/206 |
| 2016/0039756 A1* | 2/2016 | Tanga | A61K 31/452 |
| | | | 514/331 |
| 2016/0086104 A1* | 3/2016 | Wouhaybi | G06Q 10/02 |
| | | | 705/5 |
| 2016/0092771 A1* | 3/2016 | Buckley | H04L 67/02 |
| | | | 706/52 |
| 2016/0142358 A1* | 5/2016 | Zunger | G06Q 50/01 |
| | | | 709/206 |
| 2016/0248719 A1* | 8/2016 | Acharyya | H04L 51/32 |
| 2017/0249389 A1* | 8/2017 | Brovinsky | G06Q 30/02 |

\* cited by examiner

TECHNIQUES FOR FILTERING CONTENT PRESENTED IN A WEB BROWSER USING CONTENT ANALYTICS

CROSS-REFERENCE TO RELATED APPLICATIONS

This application is a continuation of pending U.S. patent application Ser. No. 14/659,208, filed Mar. 16, 2015. The aforementioned related patent application is herein incorporated by reference in its entirety.

BACKGROUND

Embodiments presented herein generally relate to content analytics, and more specifically, to filtering specified content using text and image analytics.

Social media allows an individual to easily connect with vast amounts of information. For example, social networks allow individuals to connect with friends, family, and others having similar interests. An individual can engage with other users in social media by sharing updates, multimedia (e.g., images and video), and links. Many social networks allow users to receive a custom feed aggregated from posts or other shared content of other users or syndicated data sources.

Typically, the feed displays content shared by others that a user is connected with. At times, the user may desire to remove posts with content related to certain subject matter from their feed. For example, the user may have phobias or traumatic memories triggered by certain terms or images. As another example, certain subjects or viewpoints posted on the feed, such as politics, sports, and work, may irritate or annoy a user. This is particularly so when a friend, colleague, or relative repeatedly posts content on the same subject or tends to post polemic messages.

A user has limited control over the content presented on the feed. Generally, the user has to manually remove undesired posts or content from their feed. Further, the user has to do so for each undesired post. The user may also "hide" content shared by another individual, where all content shared by that individual are prevented from being displayed on the user's feed. However, such an approach is extreme, particularly in cases where the user may only want to remove certain content by shared by that individual but still view other content that the individual may post.

SUMMARY

One embodiment presented herein describes a method for filtering content rendered on a web browser. The method generally includes receiving an aggregated feed to send to a requesting user. The aggregated feed includes one or more posts. For each of the one or more posts, content of the post is evaluated to determine whether a subject specified in a profile associated with the requesting user is present in the content. And upon determining that the subject is present in the content, the content is removed from the post.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Embodiments presented herein generally describe techniques for filtering subject matter from a web page. In particular, embodiments provide techniques for using content analytics to filter such content. For example, an analytics engine may filter content from a user's feed of aggregated posts and content on a social media web site shared by other users. For example, the user might not want to view content related to politics. The user may configure the analytics engine to filter political content from the user's feed.

Once configured, the user may visit the social network web site on a web browser. The analytics engine receives the web site feed. The feed may included aggregated posts of content shared by users. The analytics engine evaluates each post of the user feed. For instance, the analytics engine may evaluate text of the content against dictionaries and parsing rules to determine whether the text is related to politics. For example, the analytics engine may identify a post including the terms "Democrat," "Republican," and "Congress," and determine that the post is related to politics. The analytics engine may then generate a confidence score that measures the likelihood that the content is related to politics. When the confidence score exceeds a specified threshold, the analytics engine filters the content from the feed.

Advantageously, filtering unwanted content posted to a social media web site improves user experience and engagement with a social network. Rather than manually removing posts that have already been viewed, the analytics engine automatically removes posts related to unwanted topics or subjects before being presented to the user. Further, this approach allows the user to view other content from individuals who post filtered content. As a result, the user does not have to completely block the individual or hide posts from that individual.

Note, the following description relies on a social media web site as a reference example of a web site that filters specified content (e.g., text and images) from being displayed to a user. However, one of skill in the art will recognize that embodiments presented herein may be adapted to a variety of web sites, such as web-based message boards, news web sites, online encyclopedias, etc. In addition, the following description relies on an analytics engine hosted on a web server that filters specified web content from being displayed to a user. However, one of skill in the art will recognize that the analytics engine can be implemented in a variety of systems. For instance, the analytics engine can be integrated into a web browser, e.g., as a plug-in. Dictionaries and parsing rules associated with the analytics engine can be maintained locally on a system on which the analytics engine is executing.

Figure 1:
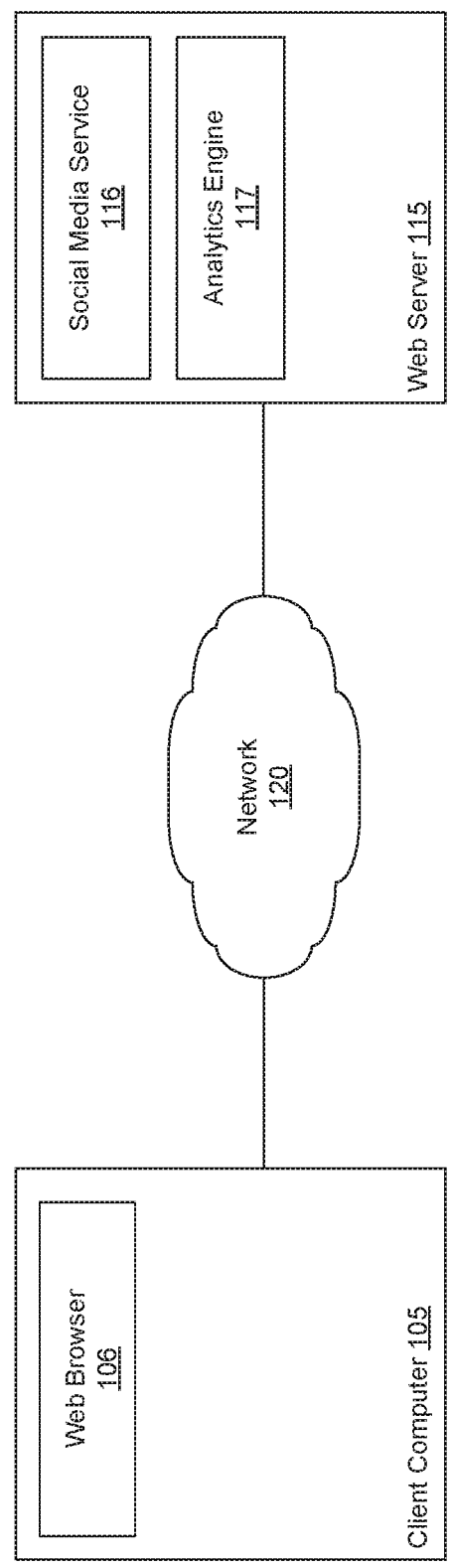
FIG. 1 illustrates an example computing environment, according to one embodiment.

FIG. 1 illustrates an example computing environment 100, according to one embodiment. As shown, the computing environment 100 includes a client computer 105 and a web server 115. The client computer 105 may be a physical computing system or a virtual machine instance executing in a computing cloud. The client computer 105 includes a web browser 106. The client computer 105 can connect to various servers over a network 120 (e.g., the Internet) via the web browser 106 to access web-based content, e.g., hosted on the web server 115.

In one embodiment, the web server 115 includes a social media service 116 and an analytics engine 117. The social media service 116 allows a user to connect with friends, family, and others who may have similar interests to the user. Through the social media service 116, users may share updates, multimedia (e.g., images and video), and links. In addition, the social media service 116 allows a given user to receive a custom feed of aggregated content shared by other users and syndicated data sources that the user has connected with. An aggregated feed for the user may display such content as a stream of posts on the web browser 106. Each post includes content shared by an individual user or advertiser as well as identifying information (e.g., name of the user or source of the content, a timestamp, etc.). The content can include text, images, video, links, and the like.

In some cases, a user may prefer to filter posts containing certain topics or subjects from their feed. For example, a user might want to filter posts having content related to politics. In one embodiment, the analytics engine 117 evaluates each post on the user feed for specified content. To do so, the analytics engine 117 may evaluate text content of each post against dictionaries related to the specified content and apply parsing rules to the text. A parsing rule specifies an arrangement of syntax and dictionary terms used to identify whether content of a post relates to specified content. The analytics engine 117 may determines whether a given sentence matches a parsing rule. If a parsing rule is satisfied (i.e., a sentence matches the parsing rule), then the analytics engine 117 can determine a likelihood of whether the post is related to a subject and filter content from the post (or the entire post) from the user's feed based on the determination. Note, the analytics engine 117 filters the content only from the user's feed. That is, content from a post remains visible to other users.

Figure 2:
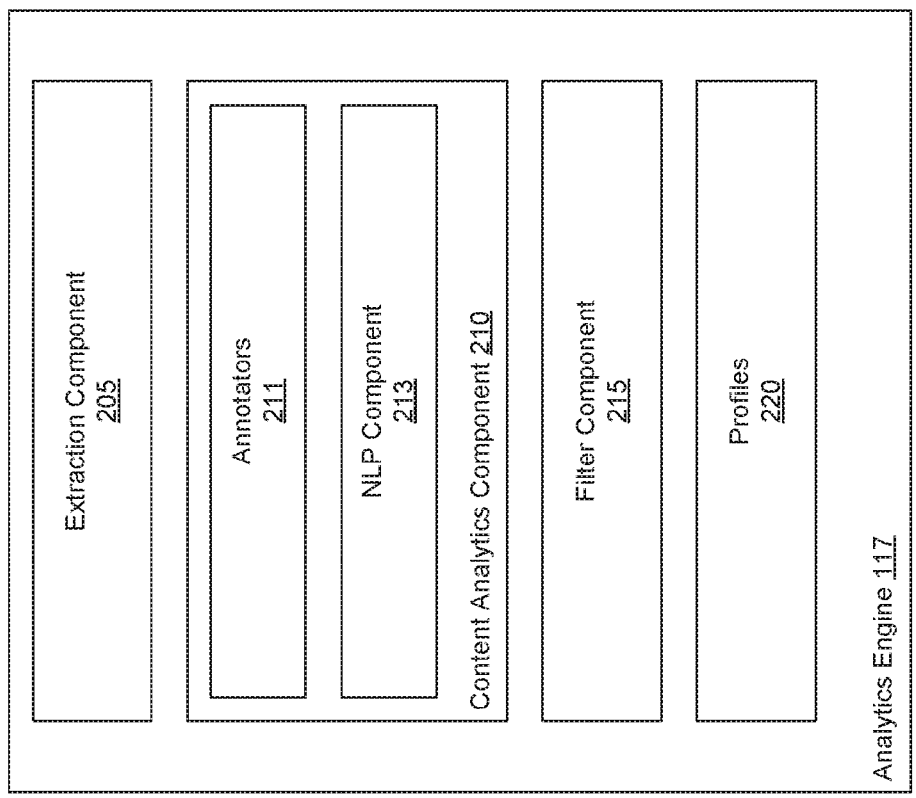
FIG. 2 further illustrates the analytics engine described relative to FIG. 1, according to one embodiment.

FIG. 2 illustrates an example of the analytics engine 117, according to one embodiment. As shown, the analytics engine 117 includes an extraction component, a content analytics component 210, a filter component 215, and profiles 220. In one embodiment, the analytics engine 117 provides a natural language processing (NLP) system, e.g., the Apache Unstructured Information Management Architecture (UIMA), used to analyze unstructured text based on a variety of configurable annotators. Various implementations of UIMA (e.g., Java, C++, etc.) may be adapted to the analytics engine. Further alternative NLP architectures, such as Generate Architecture for Text Engineering (GATE), may be adapted in place of UIMA.

In one embodiment, a given user of the social media service 116 may configure a corresponding profile 220 identifying categories content the user prefers to filter from their feed. In one embodiment, the categories are predetermined (e.g., "Political Content," "Explicit Content," "Insects," "Spiders," "Children," "Food," etc.). Further, each category may be associated with a particular annotator 211. An annotator 211 can be any combination of dictionaries, parsing rules, character rules, language identification, semantic analysis, and the like. For example, a "Political Content" category may include dictionaries for topics such as U.S. government, foreign government, Democratic Party, Republican Party, and the like. In one embodiment, a user may also manually specify a category. In such a case, the analytics engine 117 may apply NLP techniques on the manual input to determine a desired filter category, based on the available dictionaries.

In one embodiment, the extraction component 205 receives a user feed whenever the user accesses the social media service 116. The extraction component 205 sends raw text from each post to the content analytics component 210 for further processing (e.g., text content, image filenames, image metadata, a URL of a link included in the post).

As shown, the content analytics component 210 includes the annotators 211 and a NLP component 213. As stated, the annotators 211 are dictionaries of terms and parsing rules associated with a given topic. The NLP component 213 may use the parsing rules to evaluate text content at different levels, e.g., document, paragraph, or sentence levels. The NLP component 213 may determine, based on a given parsing rule, whether a sentence includes a term from a given dictionary immediately followed with a term from a related dictionary. If the sentence satisfies that parsing rule, then the NLP component 213 sends the sentence to the filter component 215. In one embodiment, the filter component determines a likelihood that content is about the subject matter based on annotator correlations. If the likelihood exceeds a threshold, then the filter component 215 removes the post from the user's feed. As a result, when the feed is presented to the user on the web browser, the filtered post does not appear on the feed.

Further, in one embodiment, the user may configure the profile 220 to only filter specific content types from a post, e.g., images. For example, the user may want to read text content about politics but not want to view images included in the post. In such a case, the NLP component 213 may evaluate image metadata and accompanying text with the post. To do so, the NLP component 213 may identify text properties of the image, such as the image filename and image metadata, along with the text content of the post. The NLP component 213 may then evaluate the text properties against annotators 211 and parsing rules 212 to determine whether the text properties match a specified subject that should be filtered from the feed. If the text properties satisfy a parsing rule 212, then the filter component 215 determines a confidence measure. If the confidence measure exceeds a specified threshold, then the filter component 215 removes the image from the post.

Figure 3A:
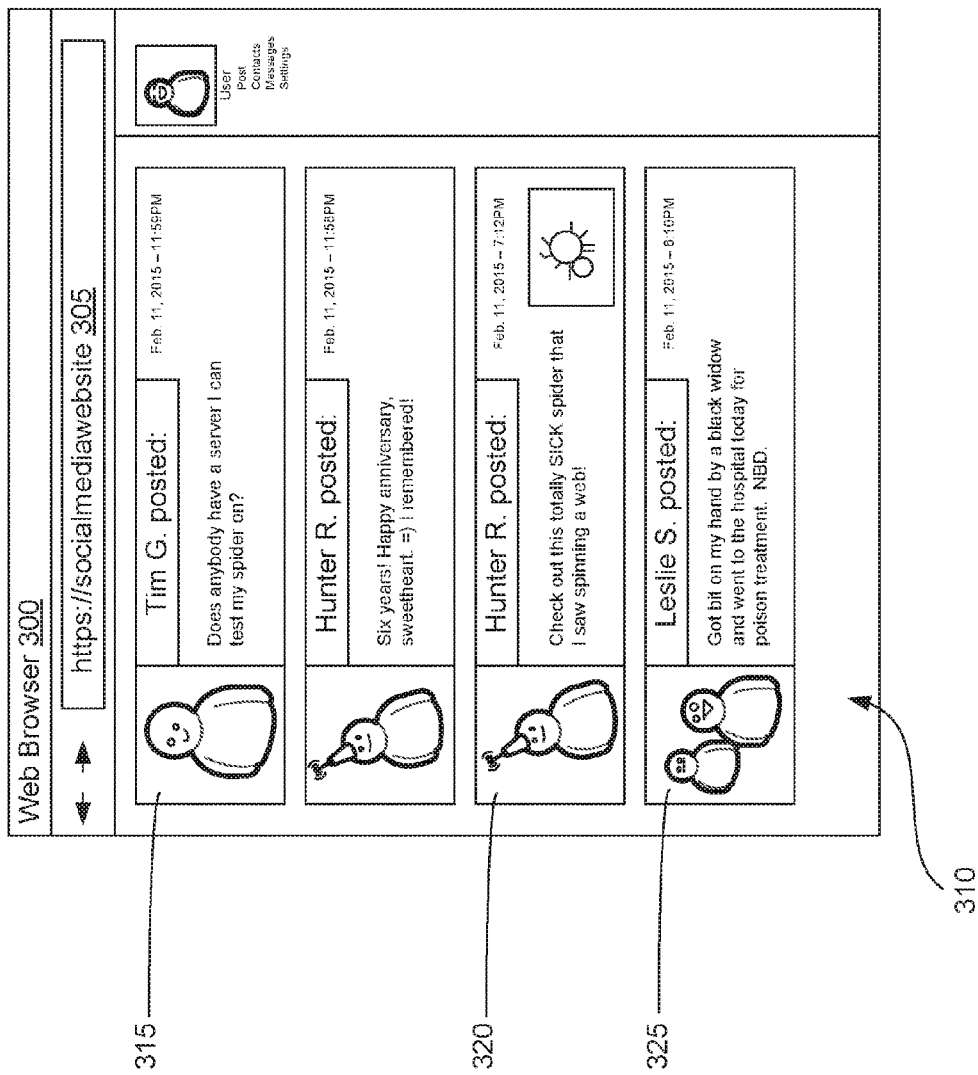
FIGS. 3A-3C illustrate an example social media web site presented on a web browser, according to one embodiment.
Figure 3B:
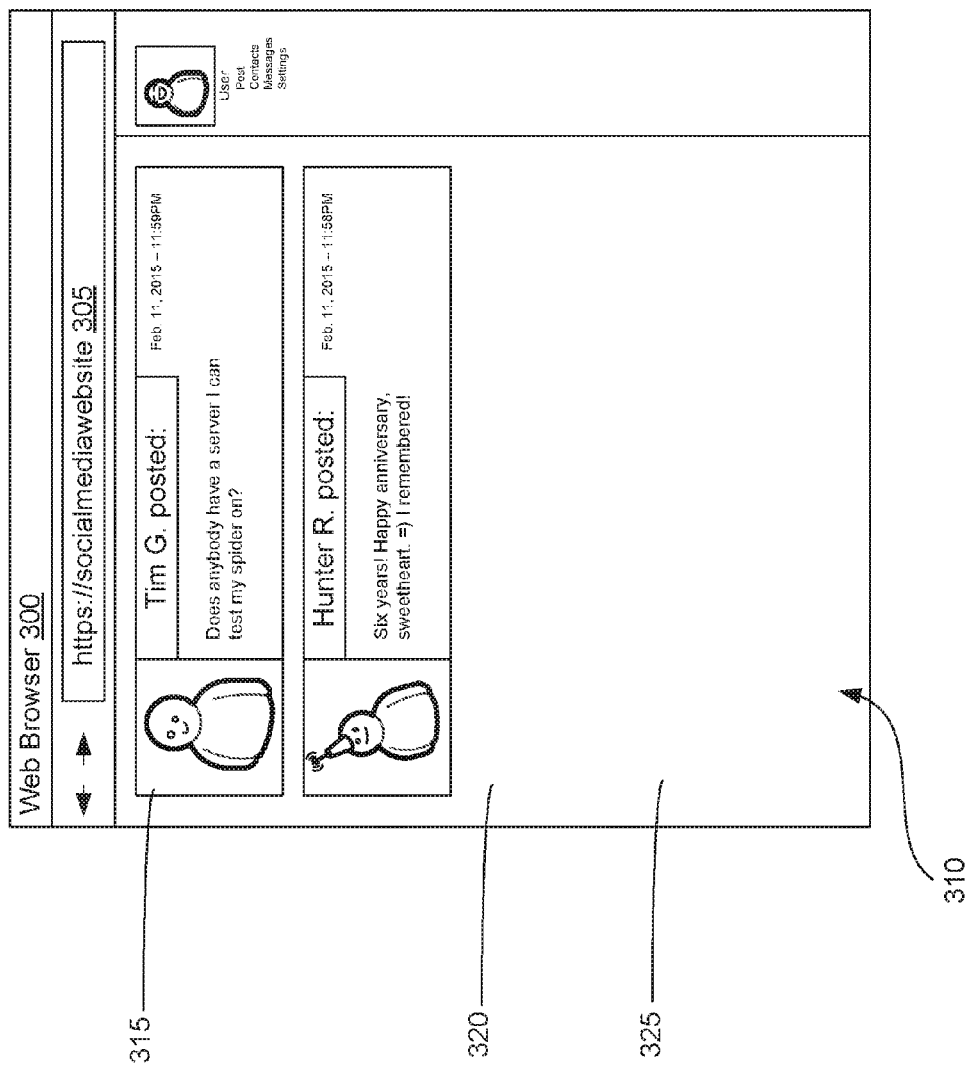
Figure 3C:
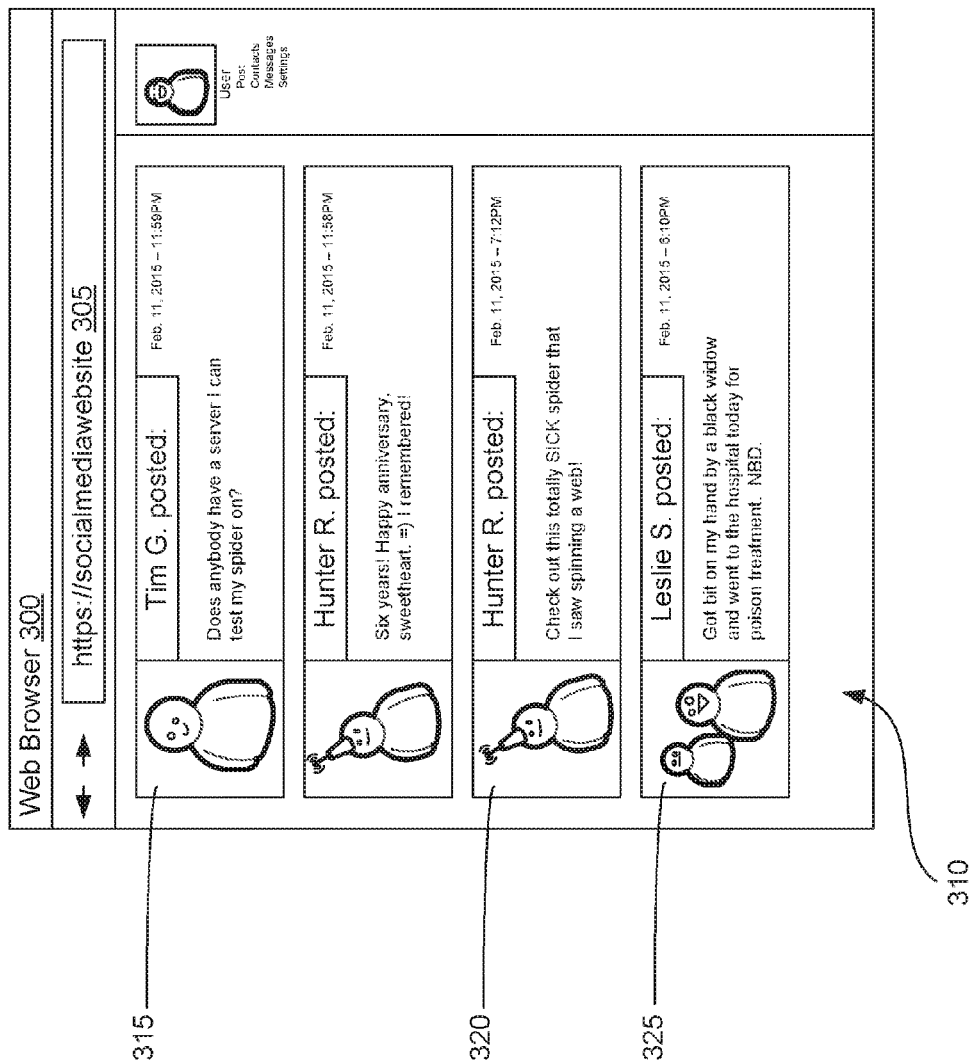

FIGS. 3A-3C illustrate an example social media web site 305 presented on a web browser 300, according to one embodiment. In particular, FIG. 3A illustrates an example social media web site 305 that includes unfiltered content on a user feed 310. Illustratively, the user feed 310 depicts four posts shared by individuals that are connected to a given user. Each post includes text content shared by a given individual. For instance, post 315 includes text content that reads "Does anybody have a server I can test my spider on?" Notably, post 320 includes an image of a spider that accompanies the text content that reads "Check out this totally SICK spider that I saw spinning a web!" Also of note, post 325 includes text that reads, "Got bit on my hand by a black widow and went to the hospital today for poison treatment. NBD."

As an example, assume that the user wishes to filter content related to the subject of spiders. In such a case, the user may specify "spiders" as a filter subject in a corresponding profile 220. As a result, the content analytics component 210 evaluates text content in each post in the user feed 310 to identify posts that include the specified filter subject of spiders. The content analytics component 210 may evaluate the text against annotators 211 related to spiders (e.g., a zoology dictionary, arachnid dictionary, etc.) as well as parsing rules 212. In this example, the content analytics component 210 may determine that posts 315, 320, and 325 satisfy parsing rules 212 because of the incidence of spider-related terms in each post. For example, post 315 directly references the word "spider." Post 320 includes the terms "web" and "spinning" in addition to the direct reference to "spider." And post 325 includes the term "black widow," which is a type of spider, as well as incidental terms that may be included in spider-related annotators (e.g., "bit" and "hand").

The filter component 215 may receive such posts as input. As stated, the filter component may determine a measure of confidence indicating the likelihood that the text content references a filter subject. In this example, the filter component 215 might score post 315 relatively low because of the high incidence of non-spider-related terms. On the other hand, the filter component 215 might score posts 320 and 325 relatively high because of the high incidence of spider-related terms.

In one embodiment, if the confidence measure of text content in the post exceeds a specified threshold, then the filter component 215 removes the post from the feed 310. FIG. 3B illustrates such an example. Illustratively, posts 320 and 325 are not displayed on the feed 310 when presented to the user. Note that post 315 remains on the feed 310. In such a case, the confidence measure for the text content in post 310 might not have exceeded the threshold.

As stated, the user can specify to only remove images from a post identified as being related to a given topic or subject. For example, a user may be uncomfortable viewing certain images (e.g., spiders or violent content) but does not mind reading text associated with that subject. FIG. 3C illustrates such an example. Illustratively, the text of posts 320 and 325 remain intact, despite the text content being related to the subject of spiders. However, post 320 does not include the image of a spider.

Figure 4:
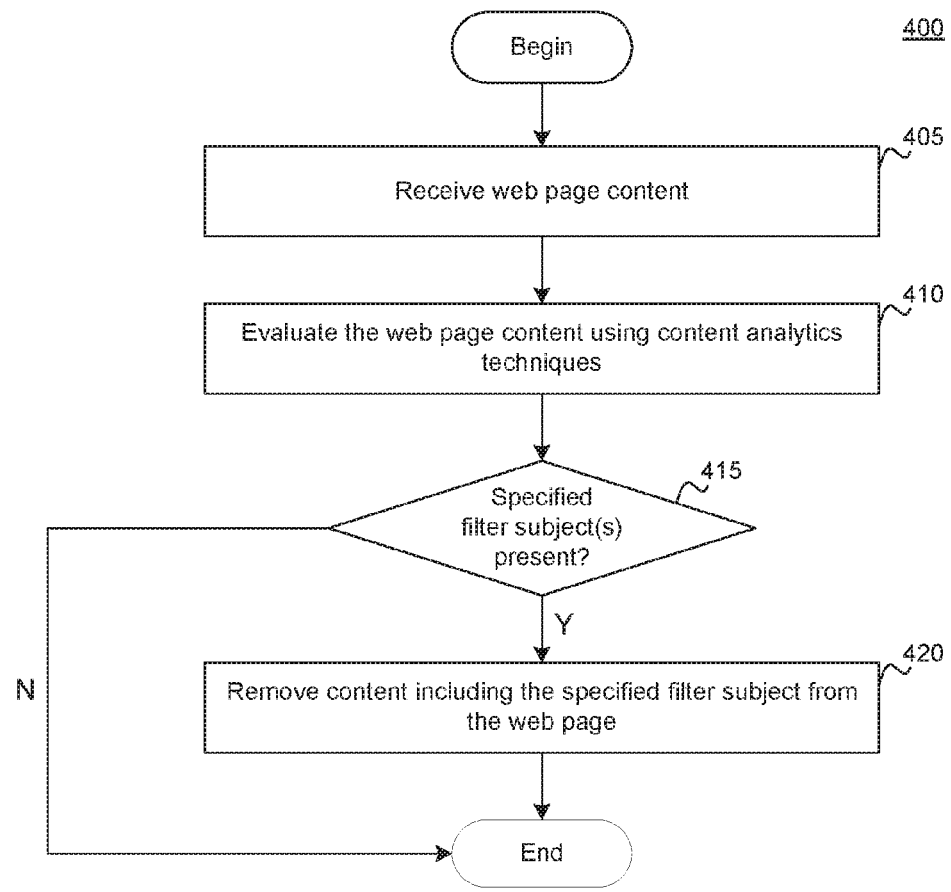
FIG. 4 illustrates a method for filtering content based on specified filter subjects, according to one embodiment.

FIG. 4 illustrates a method 400 for filtering content related to specified topics or subjects, according to one embodiment. As shown, method 400 begins at step 405, where the extraction component 205 receives web page content. For example, the web page content may be a user feed on a social media web site which includes posts by the users and also include posts from friends, family, and colleagues.

At step 410, the NLP component 213 evaluates the web page content. For example, the NLP component 213 may determine whether the content is related to a given subject (e.g., "Politics," "Children," "Spiders," etc.) using content analytics techniques. The NLP component 213 can evaluate the text against annotators associated with the subject, and against parsing rules to determine whether a match to a filter subject exists. This step is described in further detail relative to FIG. 5. At step 415, the filter component 215 determines whether the subjects identified by the NLP components match a specified filter subject. If so, then at step 420, the filter component 215 may remove the content from the feed. The filter component 215 may remove the content from the post. Alternatively, the filter component 215 may remove selected elements of the post, such as images, as specified in a profile of the user.

Figure 5:
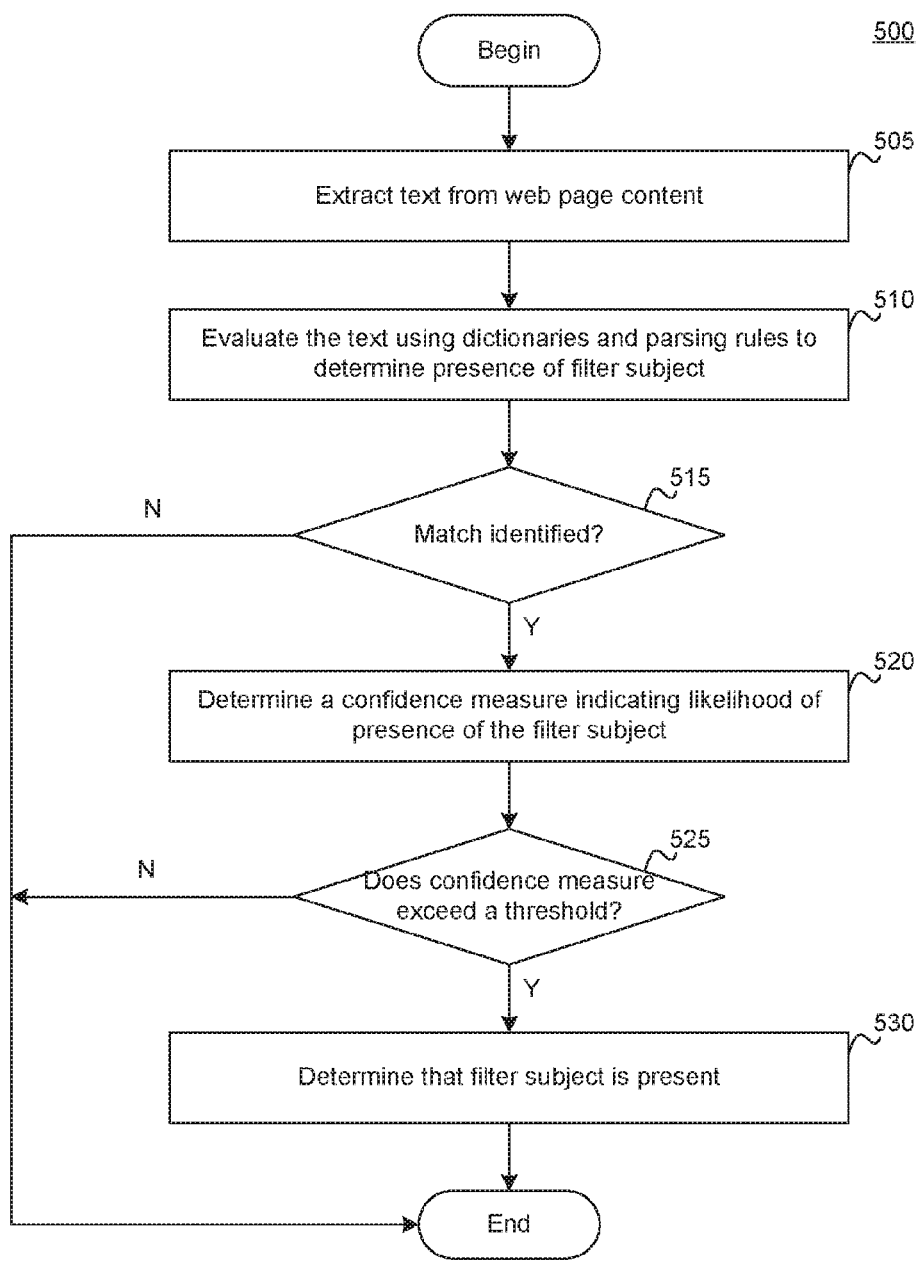
FIG. 5 illustrates a method for evaluating content using content analytics to determine whether filter subjects are present in the content, according to one embodiment.

FIG. 5 illustrates a method 500 for determining what subjects or topics are discussed in a feed post, according to one embodiment. At step 505, the extraction component 205 obtains text of the web page (e.g., posts on a feed of a social media web site). At step 510, the NLP component 213 evaluates the text using annotators and parsing rules to determine the presence of specified filter subjects. For example, the NLP component 213 may evaluate the text against a set of annotators related to the topic of spiders if the user specifies spiders as a filter subject.

At step 515, the NLP component 213 determines whether a match to a given parsing rule is identified in the text. If so, then at step 520, the NLP component 213 determines a confidence measure indicating a likelihood of the text containing the specified subject. At step 525, the filter component 215 determines whether the confidence measure exceeds a specified threshold.

If so, the filter component 215 determines that to filter the content included in the post. The filter component 215 removes the content from the feed. As stated, if the profile associated with the user specifies to remove only certain elements from the post (e.g., images), the filter component 215 may leave other elements (e.g., text) intact. If the confidence measure does not exceed the threshold, then the filter component 215 does not remove the content from the feed.

Figure 6:
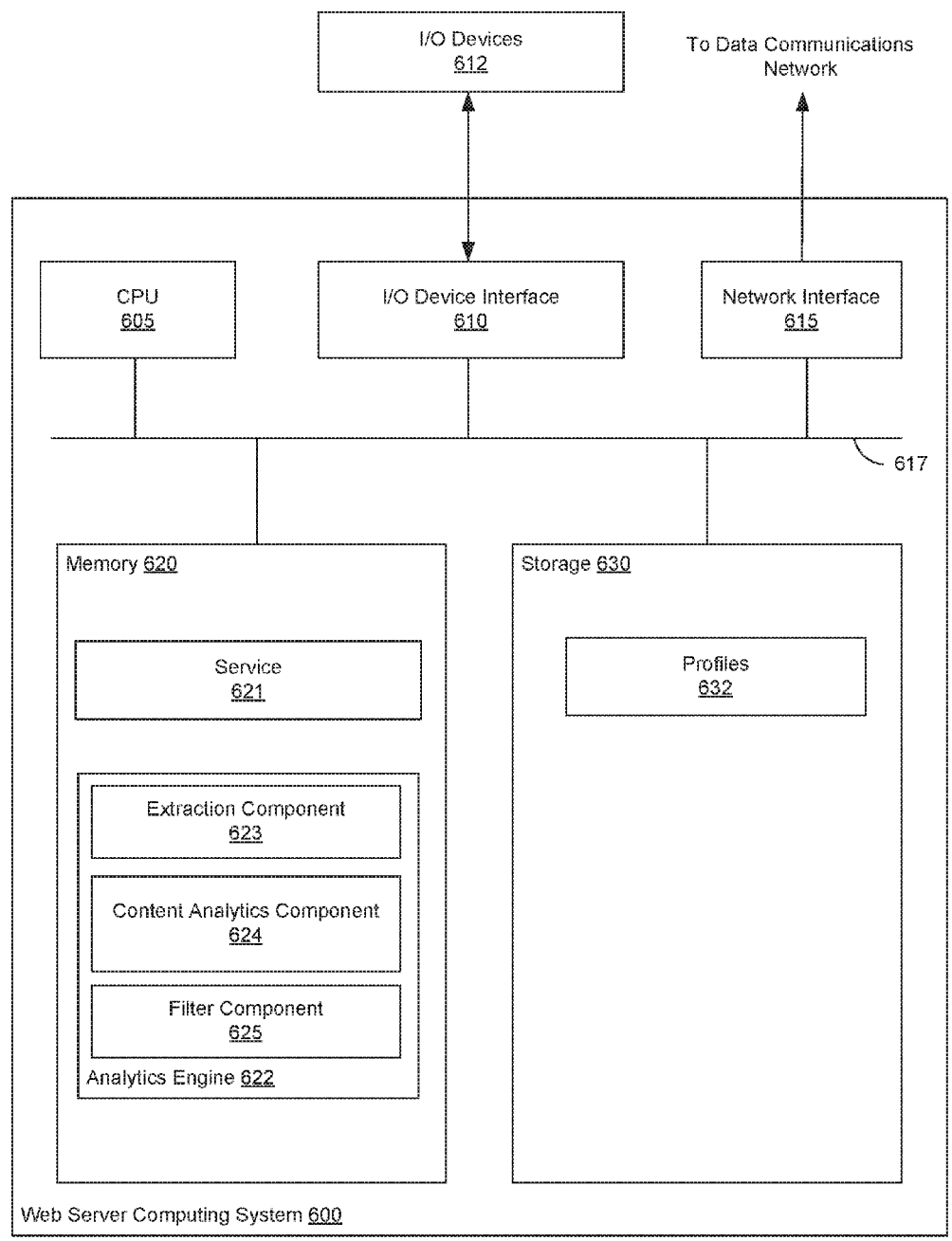
FIG. 6 illustrates a web server computing system configured to filter specified subjects in web content, according to one embodiment.

FIG. 6 illustrates a server computing system 600 configured to filter content discussing specified topics or subjects from a user's social media feed, according to one embodiment. As shown, the web server computing system 600 includes, a central processing unit (CPU) 605, a network interface 615, a memory 620, and storage 630, each connected to a bus 617. The web server computing system 600 may also include an I/O device interface 610 connecting I/O devices 612 (e.g., keyboard, display and mouse devices) to the web server computing system 600. Further, in context of this disclosure, the computing elements shown in the web server computing system 600 may correspond to a physical computing system (e.g., a system in a data center) or may be a virtual computing instance executing within a computing cloud.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 617, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a service 621 and an analytics engine 622. And storage 630 includes profiles 632. The service 621 is a social media web site that allows users to share content with one another. Such content is displayed on a user feed in a web browser. A user may specify, in a corresponding profile 632, content subjects to filter from the feed (e.g., politics, spiders, children, etc.).

In one embodiment, the analytics engine 622 includes an extraction component 623, a content analytics component 624, and a filter component 625. The extraction component 623 receives web page content, e.g., a post from a user feed. The content analytics component 624 evaluates text in the received content to determine whether the content is related to a specified filter subject. The content analytics component 624 may evaluate the text against annotators and parsing rules associated with the filter subject. The content analytics component 624 sends content that matches a given parsing rule to the filter component 625. The filter component 625 determines a measure of confidence that indicates the likelihood that the specified filter subject is present in the content. If the confidence measure exceeds a specified threshold, then the filter component 625 may remove the content from the feed. As a result, when the web browser presents the feed to the user, the post including such content is not displayed.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the analytics engine 117) or related data available in the cloud. For example, the analytics engine 117 could execute on a computing system in the cloud and determine whether web page content includes text related to a specified filter subject. In such a case, the analytics engine 117 could generate a confidence measure related to the content and filter the content based on the confidence measure. Further, the analytics engine 117 could determine appropriate annotators for manually input filter subjects and store sets of such annotators at a storage location in the cloud. Doing so allows a user to access this information from any computing system attached to a network connected to the cloud (e.g., the Internet).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A method for filtering content rendered on a web browser, the method comprising:
    receiving an aggregated feed to send to a requesting user, wherein the aggregated feed includes one or more posts, wherein the one or more posts includes a first post from a source subscribed to by the first user and a second post from a source shared based on interests of the requesting user, wherein each of the one or more posts includes unstructured text, and wherein the first post includes an image;
    evaluating unstructured text of the first and second posts using a plurality of natural language processing (NLP) annotators to determine whether the unstructured text of the first and second posts include content relating to a first category of a plurality of categories, wherein the first category is specified in a profile associated with the requesting user, and wherein each NLP annotator provides at least a dictionary and a parsing rule corresponding to a category in the plurality of categories;
    determining, based on the evaluation, that the unstructured text of the first post includes content relating to the first category, based on determining that the unstructured text of the first post includes a predefined arrangement of terms;
    determining, based on the evaluation, that the unstructured text of the second post include content relating to the first category; and
    upon determining, based on the profile associated with the requesting user, that the requesting user has specified to only remove images relating to the first category and to not remove text relating to the first category:
        removing only the image from the first post, wherein the unstructured text of the first and second posts remains unmodified.

2. The method of claim 1, further comprising:
    sending the aggregated feed to the requesting user.

3. The method of claim 1, wherein determining that both the unstructured text of the first post and the unstructured text of the second post include content relating to the first category comprises, for each of the first and second posts:
    upon determining that the parsing rule is satisfied for one of the plurality of NLP annotators, determining a measure of confidence indicating a likelihood that the content relates to the first category.

4. The method of claim 3, wherein determining that the unstructured text of the first post includes content relating to the first category further comprises:
    upon determining that the measure of confidence exceeds a specified threshold, determining to remove the image from the first post.

5. The method of claim 1, wherein the image included in the first post is identified by a filename and metadata, wherein the filename and metadata are included in the unstructured text of the first post, and are processed using the plurality of NLP annotators.

6. The method of claim 5, the method further comprising:
    determining, based on the filename and metadata, that the image includes content relating to the first category.

7. The method of claim 1 wherein the parsing rule specifies an arrangement of terms to be used to determine whether the content relates to the category.

8. The method of claim 7, wherein at least a first NLP annotator of the plurality of NLP annotators includes at least a first dictionary and a related dictionary, and wherein a first parsing rule of the first NLP annotator specifies an arrangement of terms where a term from the related dictionary immediately follows a term from the first dictionary.

9. The method of claim 1, the method further comprising:
    evaluating the unstructured text of the first post using the plurality of NLP annotators to determine whether the unstructured text of the first post includes content relating to a second category of the plurality of categories; and
    upon determining, based on the evaluation, that the unstructured text of the first post includes content relating to the second category, removing a first sentence from the unstructured text of the first post.

10. The method of claim 8, wherein determining that the unstructured text of the first post includes content relating to the first category comprises determining that the first parsing rule is satisfied, wherein determining that the first parsing rule is satisfied comprises:
    identifying a first term in the unstructured text of the first post;
    determining that the first term is specified in a first dictionary, wherein the first dictionary is associated with the first category;
    identifying a second term in the unstructured text of the first post; and
    determining that the second term is specified in a second dictionary, wherein the second dictionary has a predefined relationship with the first dictionary.

* * * * *